(12) United States Patent
Culca et al.

(10) Patent No.: US 11,372,796 B2
(45) Date of Patent: Jun. 28, 2022

(54) BUS SUBSCRIBER AND METHOD FOR OPERATING A BUS SUBSCRIBER

(71) Applicant: EATON INTELLIGENT POWER LIMITED, Dublin (IE)

(72) Inventors: Horea-Stefan Culca, Lohmar (DE); Olaf Boecker, Alfter (DE)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/210,792

(22) Filed: Mar. 24, 2021

(65) Prior Publication Data

US 2021/0209051 A1 Jul. 8, 2021

Related U.S. Application Data

(63) Continuation of application No. 16/089,380, filed as application No. PCT/EP2017/056553 on Mar. 20, 2017, now abandoned.

(30) Foreign Application Priority Data

Apr. 8, 2016 (DE) ...................... 10 2016 106 531.5

(51) Int. Cl.
*G06F 13/40* (2006.01)
*G06F 11/34* (2006.01)

(52) U.S. Cl.
CPC ........ *G06F 13/4068* (2013.01); *G06F 11/349* (2013.01)

(58) Field of Classification Search
CPC ................................. G06F 13/40; G06F 11/34

USPC ......................................................... 710/105
See application file for complete search history.

(56) References Cited

U.S. PATENT DOCUMENTS

| 7,257,656 | B1 | 8/2007 | Culca |
| 8,315,516 | B2 | 11/2012 | Nakashima |
| 8,803,505 | B2 | 8/2014 | Chizevsky et al. |
| 9,054,517 | B1 | 6/2015 | Zhu |
| 9,461,459 | B2 | 10/2016 | Henneberger |
| 9,958,491 | B2 | 5/2018 | Seff |
| 10,029,566 | B2 | 7/2018 | Chimner |
| 10,030,648 | B2 | 7/2018 | Stoner |
| 10,153,118 | B2 | 12/2018 | Lagree |
| 10,194,513 | B2 | 1/2019 | Jayawardena et al. |

(Continued)

FOREIGN PATENT DOCUMENTS

| DE | 3726742 A1 | 2/1989 |
| DE | 102009055797 A1 | 5/2011 |

(Continued)

*Primary Examiner* — Christopher B Shin
(74) *Attorney, Agent, or Firm* — Leydig, Voit & Mayer, Ltd.

(57) ABSTRACT

A device, having a safe state, is coupleable to a communication bus. The device includes a first logic unit; a second logic unit; a monitoring circuit; a transmission unit; and a first test line. The device is adapted such that the first logic unit communicates with a bus via the transmission unit in a communication phase and the monitoring circuit emits a monitoring signal to the transmission unit upon a fault so that the transmission unit blocks the communication. The first and/or the second logic unit is coupled to the monitoring circuit via the first test line so as to emit a first test signal to the monitoring circuit.

19 Claims, 4 Drawing Sheets

(56) References Cited

U.S. PATENT DOCUMENTS

| | | | |
|---|---|---|---|
| 10,205,319 B2 | 2/2019 | Pereira et al. | |
| 2004/0153870 A1 | 8/2004 | Konz et al. | |
| 2009/0290485 A1 | 11/2009 | Baumeister et al. | |
| 2010/0002594 A1 | 1/2010 | Elend | |
| 2011/0128046 A1 | 6/2011 | Korrek | |
| 2017/0324631 A1 | 11/2017 | Komanek | |
| 2020/0301866 A1* | 9/2020 | Culca | G06F 11/349 |

FOREIGN PATENT DOCUMENTS

| | | |
|---|---|---|
| DE | 102015201278 A1 | 7/2016 |
| EP | 2117094 A2 | 11/2009 |
| EP | 2720051 A1 | 4/2014 |
| JP | 2001159651 A | 6/2001 |
| WO | WO 2008037495 A2 | 4/2008 |

* cited by examiner

BUS SUBSCRIBER AND METHOD FOR OPERATING A BUS SUBSCRIBER

CROSS-REFERENCE TO PRIOR APPLICATIONS

This application is a Continuation of U.S. patent application Ser. No. 16/089,380, which is a U.S. National Phase application under 35 U.S.C. § 371 of International Application No. PCT/EP2017/056553, filed on Mar. 20, 2017, and claims benefit to German Patent Application No. DE 10 2016 106 531.5, filed on Apr. 8, 2016. The International Application was published in German on Oct. 12, 2017 as WO 2017/174338 under PCT Article 21(2). All of the above applications are hereby incorporated by reference herein.

FIELD

The invention relates to a bus subscriber and a method for operating a bus subscriber.

BACKGROUND

A bus with bus subscribers can be used in automation systems for control and regulation of devices and equipment. A bus subscriber can be implemented as a master or a slave. The bus subscriber can be part of a safety device.

Safety devices from the field of functional safety, e.g. in accordance with the Machinery Directive, generally have a "safe state," i.e. a state of the machine that poses no threat to people and equipment. The "safe state" is often the "currentless" state. In this state, all safety outputs of the safety controller can perhaps be switched off.

Such a safety controller, designed for higher safety categories or Safety Integrity Levels, abbreviated SIL, has a redundant structure and often includes a central processing unit that includes two logic units and two-channel inputs and outputs. The logic units monitor each other and also the redundant inputs and outputs, each logic unit having the ability to bring the device to a safe state an error is detected. For example, the logic units can be microprocessors or microcontrollers.

The so-called common cause faults (CCF) particularly are to be considered. An example of this is a common power supply for both channels, such as two logic units. If the supply voltage of both logic units drifts to a value outside the permitted range (overvoltage or undervoltage), it can no longer be expected that at least one of the logic units detects errors reliably and puts the device into the safe state.

In this case, as indicated in the document EP 2117094 A2, an additional hardware circuit may be implemented for monitoring the supply voltage, which turns off an output driver and thus puts the unit into the safe state independent of a microcontroller in the corresponding error case. This can be accomplished in a compact security device with local safe outputs with little effort.

However, in a safety-related system with security modules distributed via a communication bus, a central processing unit, for example, does not have direct access to bus-coupled output modules, so that a circuit implemented in the central processing unit cannot switch off these outputs directly, independent of the logic units.

SUMMARY

In an embodiment, the present invention a device, having a safe state, is coupleable to a communication bus and includes processing circuitry. The processing circuitry includes: a first logic unit and a second logic unit, the first logic unit and the second logic unit are bidirectionally coupled to each other, the first logic unit has a bus terminal, the first logic unit being configured to output a connection signal via the bus terminal in a communication phase; a transmission unit, the transmission unit having an input coupled to the bus terminal of the first logic unit and configured to receive the connection signal, the transmission unit being configured to controllably output, via an output of the transmission unit, a bus signal based upon a monitoring signal received at a control input and the received connection signal; a monitoring circuit, the monitoring circuit comprising a control output coupled to the control input of the transmission unit, the monitoring circuit configured to controllably output the monitoring signal to the control input of the transmission unit based upon a fault determination; a first test line, the first test line coupling an output of the second logic unit or an output of the first logic unit to an input of the monitoring circuit, the second logic unit or the first logic unit being configured to controllably emit a first test signal to the monitoring circuit via the respective output and the test line to the monitoring circuit. The monitoring circuit is configured to controllably output the monitoring signal based upon the first test signal to simulate the fault determination. The transmission unit is configured such that, upon receiving the monitoring signal indicating a fault situation: to not emit the bus signal at the output of the transmission unit or to emit the bus signal comprising an indication of an inactive state or an inactive level.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
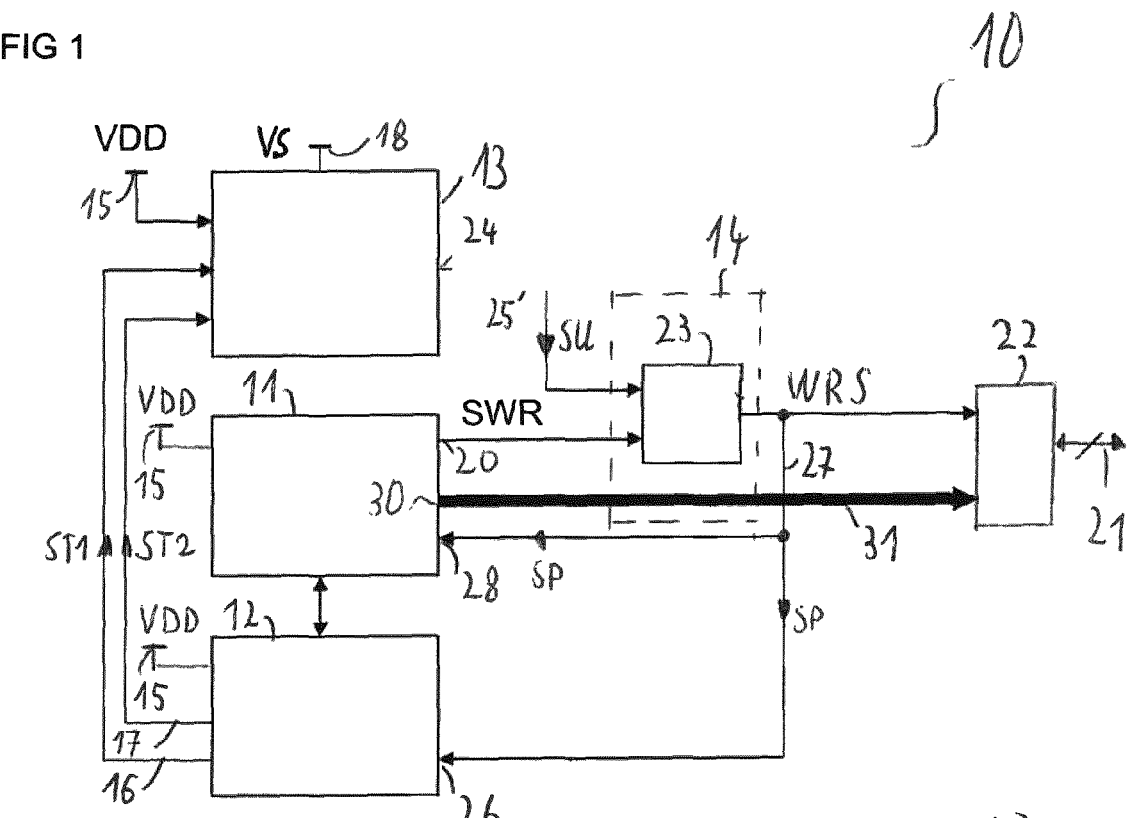
FIGS. 1 to 3 example embodiments of a bus subscriber,
FIG. 4 an example embodiment of a monitoring circuit,
FIG. 5 a further example embodiment of a bus subscriber, and
FIG. 6 a further example embodiment of a monitoring circuit.

In embodiments, the present invention provides a bus subscriber and a method for operating a bus subscriber in which the safety is increased.

In one embodiment, a bus subscriber comprises a first and a second logic unit, a monitoring circuit, and a transmission unit. The bus subscriber is designed such that, in a communication phase, the first logic unit communicates with a bus via the transmission unit and, in case of a fault, the monitoring circuit emits a control signal to the transmission unit so that the transmission unit blocks the communication.

A further communication and thus a faulty communication is advantageously prevented in case of a fault. In case of a fault, messages from the bus subscriber cannot be delivered to the bus.

The first logic unit can be a microcontroller, microprocessor, application-specific integrated circuit (ASIC), field programmable gate array (FPGA), or finite state machine.

The second logic unit can be realized as a microcontroller, microprocessor, application-specific integrated circuit (ASIC), field programmable gate array (FPGA), or finite state machine.

In one embodiment, the first and/or the second logic unit tests in a test phase whether the transmission unit receives the monitoring signal.

In one embodiment, the first and/or the second logic unit tests in the test phase whether the transmission unit blocks the communication upon receipt of the monitoring signal.

In one embodiment, said first and/or the second logic unit thus tests whether the monitoring circuit and the transmission unit block the communication in case of a fault.

In one embodiment, the control circuit emits the control signal in case of a fault due to common causes or a failure due to common causes. The monitoring circuit can emit the monitoring signal even in the event of an imminent error due to common causes or an imminent failure due to common causes. The bus subscriber can be designed to carry out actions to control errors due to a common cause and/or failures due to a common cause.

In one embodiment, failures of several of components, such as the first and the second logic unit, are referred to as common cause failures that occur as a result of a single fault cause or a single event. The failure or failures can, for example, occur due to a common external cause, due to functional dependencies of the components, or due to a common cause intrinsic to the components. The common external cause may, for example, be a voltage drop of a supply voltage, an overvoltage or an environmental condition, such as moisture, vibration or a temperature outside a predetermined range that cause several components to fail. The monitoring circuit or suitable monitoring circuits are implemented accordingly.

The bus subscriber can be realized as a master or a slave.

In one embodiment, the monitoring circuit generates the control signal when a supply voltage of the first and the second logic unit is outside a predetermined range.

In one embodiment, the monitoring circuit is coupled to the transmission unit via a control line. The monitoring circuit emits the monitoring signal to the transmission unit over the control line.

In one embodiment, the transmission unit comprises a switch arrangement that is connected to the control side of the control line. The monitoring signal is fed to the switch assembly.

In one embodiment, a bus terminal of the first logic unit is coupled to the bus via the transmission unit. The first logic unit generates a connection signal and emits it to the transmission unit via the bus terminal.

In one embodiment, the first and/or the second logic unit is coupled to the monitoring circuit through a first test line of the bus subscriber. The first and/or second logic unit emits a first test signal to the monitoring circuit via the first test line.

In one embodiment, the transmission unit is coupled with a signal input of the first and/or the second logic unit via a feedback line of the bus subscriber. The transmission unit provides a test signal of the first and/or second logic unit via the feedback line.

In one embodiment, a method for operating a bus subscriber comprises the communication of a first logic unit in a communication phase via a transmission unit with a bus and, in case of a fault, emitting a monitoring signal from a monitoring circuit of the transmission unit, such that the transmission unit blocks the communication. The bus subscriber comprises the first logic unit, the monitoring circuit and the transmission unit.

The bus subscriber may comprise a second logic unit.

The bus subscriber implements a method for achieving a secure communication interruption and thus supports the functional safety. The bus subscriber can be implemented as a safety module, CPU, safety-related output module, safety bus module, or smart input/output module, abbreviated I/O module.

The bus subscriber has a two-channel structure and is normally implemented with two logic units. A module that communicates over a bus includes a bus interface that can contain a physical bus coupling (bus driver, bus transceiver, coupling transformer or the like—sometimes called PHY), a bus-specific communication module (sometimes called Media Access Controller, MAC), and/or a communication controller. Some of these elements can be integrated in the logic unit.

The interface between the logic unit and the MAC/communication controller can be parallel (address/data bus) or serial (for example, a Serial Peripheral Interface, SPI, or a Universal Asynchronous Receiver Transmitter, UART) insofar as the MAC is not integrated in the logic unit.

In one embodiment, the bus subscriber is realized such that it safely interrupts the communication between the logic unit and the bus at at a suitable location, in order to prevent the transmission of corrupted data. For this purpose, the bus subscriber has suitable components for communication interruption. The bus subscriber can advantageously cyclically test these communication interruption components for their effectiveness. This makes the circuit "safe." The normal function of the bus subscriber is advantageously not disturbed by the test. General local faults in the bus subscriber can advantageously be detected. A general fault is usually detected by the logic units, so long as at least one logic unit is working properly. Only a CCF, which affects both logic units, is to be detected by the monitoring unit. Interruption of the communication to the central processing unit stops the transmission of corrupted safety-relevant data from the bus subscriber to the CPU or from the CPU to a bus subscriber (for example, via secure outputs). The bus subscriber can be implemented as a central processing unit.

FIG. 1 describes an example embodiment of a bus subscriber 10 comprising a first logic unit 11, a second logic unit 12, a monitoring circuit 13 and a transmission unit 14. The bus subscriber 10 furthermore comprises a supply voltage terminal 15 to which the first and the second logic units 11, 12 and the monitoring circuit 13 are connected. The first and the second logic unit 11, 12 are bidirectionally connected to each other. The first logic unit 11 may be a microcontroller, microprocessor, ASIC, FPGA, finite state machine, or watchdog. The second logic unit 12 may also be a microcontroller, microprocessor, ASIC, FPGA, finite state machine, or watchdog. An output of the second logic unit 12 is connected via a first test line 16 to a first control input of the monitoring circuit 13. The second logic unit 12 may also be connected via a second test line 17 to a second control input of the monitoring circuit 13. The monitoring circuit 13 may be connected to a further supply voltage terminal 18.

The first logic unit 11 comprises a bus terminal 20 that is coupled with a bus 21 via the transmission unit 14. The bus subscriber 10 can also comprise a media access controller 22 (MAC). The bus terminal 20 is connected with the MAC 22 via the transmission unit 14. The MAC 22 is connected to the bus 21, possibly via another bus driver. The transmission unit 14 comprises a logic circuit 23, connected to the bus terminal 20 on the input side. An output of the logic circuit 23 is coupled to the MAC 22. The monitoring circuit 13 comprises a control output 24 that is connected with the transmission unit 14 via a control line 25. The control output 24 of the monitoring circuit 13 is thus connected to a control input of the logic circuit 23.

The output of logic circuit 23 is connected to a signal input 26 of the second logic unit 12 via a feedback line 27. The output of logic circuit 23 can furthermore also be connected to a signal input 28 of the first logic unit 11 via the feedback line 27. The first logic unit 11 can have at least one more bus terminal 30, connected via a bus line 31 with the MAC 22. The bus subscriber 10 can be configured as a master.

A supply voltage VDD is applied to the supply voltage terminal 15. The supply voltage VDD is supplied to both the first and the second logic units 11, 12 and to the monitoring circuit 13. The monitoring circuit 13 can be implemented as a voltage monitoring circuit. The monitoring circuit 13 monitors whether the supply voltage VDD is within a predetermined range. The monitoring circuit 13 monitors whether the supply voltage VDD is in the following predetermined range:

$$VMIN < VDD < VMAX$$

VMIN is the value of the minimum permissible supply voltage and VMAX is the value of the maximum permissible supply voltage. The monitoring circuit 13 is supplied with another supply voltage VS, which is independent of the supply voltage VDD, via the other supply voltage terminal 18. The other supply voltage VS can, for example, be 24 V.

If the currently applied supply voltage VDD does not lie in the predetermined range, the monitoring circuit 13 emits a monitoring signal SU at its control output 24. The monitoring signal SU is fed to the transmission unit 14 via control line 25. The monitoring signal SU is thus supplied to the logic circuit 23. The first logic unit 11 emits a connection signal SWR, which is fed to transmission unit 14 and thus to the logic circuit 23, at its bus terminal 20. The transmission unit 14 generates a bus signal WRS depending on of the connection signal SWR and the monitoring signal SU. The bus signal WRS may be realized as WRsafe. The logic circuit 23 emits the bus signal WRS at its output depending on the connection signal SWR, if the monitoring signal SU signals that no fault event is present. However, if the monitoring signal SU signals the presence of a fault situation, the logic circuit 23 and therefore the transmission unit 14 emits no bus signal WRS and/or a bus signal WRS with an inactive state or an inactive level.

The monitoring signal SU has a first logic value in case of fault and a second logic value if no fault situation is present. The first logic value differs from the second logic value. For example, the first logic value can be 0 and the second logic value can be 1. The bus signal WRS is thus formed by logically combining the connection signal SWR and the monitoring signal SU. The logic circuit 23 may, for example, implement an AND function. The bus signal WRS can then be formed as an AND connection of the monitoring signal SU and the connection signal SWR. If the bus subscriber 10, in particular the monitoring circuit 13 and the logic circuit 23, is implemented as "positive logic," then the active level of the signals, such as the connection signal SWR, has the value 1 and the inactive level has the value 0. The logic circuit 23 may be implemented as an AND gate.

In practice, the write signals are often inverted. The bus subscriber 10, in particular the monitoring circuit 13 and the logic circuit 23, can be realized as "negative logic". The active level of the signals, such as the connection signal SWR, has the value 0 and the inactive level the value 1. In case of a fault, the monitoring signal SU has the first logic value with the value 1 and the second logic value with the value 0 if no fault situation is present. The logic circuit 23 may be implemented as an OR gate.

The monitoring signal SU changes the signal at the output of the logic circuit 23 at the "positive" and the "negative" logic: In case of a fault, the monitoring signal SU has the active level, meaning the first logic value, and thus blocks transmission via the logic circuit 23. To implement the logic function, the logic circuit 23 can have logic gates, such as AND or OR gates. The coupling of the first logic unit 11 with the MAC is advantageously interrupted once the monitoring circuit 13 detects a fault situation.

The control signals are then typically "active-low" (i.e., the value 0 corresponds to an active state or level and the value 1 corresponds to an inactive state or level).

The first logic unit 11 emits a signal to the MAC 22 via the bus line 31 or receives a signal from the MAC 22. The bus line 31 can be implemented as an address/data bus (A/D bus). The bus line 31 can comprise multiple address and data lines.

In a test phase, the second logic unit 12 emits a first test signal ST1 to the monitoring circuit 13 through the first test line 16. The second logic unit thus triggers a first test in the monitoring circuit 13. In the first test the behavior of the bus subscriber 10 is, for example, tested in the event of a drop of the supply voltage VDD below the minimum permissible supply voltage VMIN. If the second logic unit triggers the test of the first fault situation via the first test signal ST1 while the first logic unit 11 switches the connection signal SWR to "active", the monitoring unit 13 emits the monitoring signal SU with the first logic value. The transmission unit 14 thus blocks the transmission of the connection signal SWR, so that the bus signal WRS is inactive.

A test signal SP is supplied to the signal input 26 of the second logic unit 12 and the signal input 28 of the first logic unit 11 via the feedback line 27. The test signal SP corresponds to the bus signal WRS. If, after emitting the first test signal ST1, the second logic unit 12 records that bus signal WRS is inactive, then the test of the first fault event has been successful. The monitoring circuit 13 and the transmission unit 14 have thus functioned properly in the test of the first fault event. However if, after emitting the first test signal ST1, the second logic unit 12 receives the bus signal WRS as active, the second logic unit 12 records that the test of the first fault event has not been successful. Despite this simulated first fault situation, the first logic unit 11 could still communicate with the bus 21 via the transmission unit 14 and the MAC 22. The first and the second logic units 11, 12 can monitor the test jointly.

In another portion of the test phase, the second logic unit 12 can emit a second test signal ST2 to monitoring circuit 13 via the second test line 17. The second logic unit 12 can thus trigger a second test in the monitoring circuit 13. In the second test the behavior of bus subscriber 10 can, for example, be tested for the situation where the supply voltage VDD exceeds the maximum permissible supply voltage VMAX. The sequence after generation of the second test signal ST2 corresponds to the sequence after generating the first test signal ST1.

The bus communication occurs via the MAC component 22, which is coupled to the logic units 11, 12 (or to the first logic unit 11) through a parallel address/data bus 31 with chip select, read and write signals (e.g. Profibus-ASIC, VPC3/SPC3 for Profibus-DP or SWD-ASIC for EATONs SmartWire-DT). The bus subscriber 10 can, for example, be implemented as a "central processing unit," such as a CPU or a gateway. The logic units 11, 12 have full control over the data transmission to the MAC 22.

According to FIG. 1, the first logic unit 11 drives the parallel bus 31 to which the MAC component 22 is connected. The connection signal SWR, also called write signal, can be blocked from the independent monitoring circuit 13 by means of logic circuit 23, so that the first logic unit 11 can no longer send data to the bus 21 and a communication interruption is achieved. This function is tested periodically so as to design the circuit to be safe. In a communication gap—when the first logic unit 11 controls the data transmission—the first logic unit 11 exchanges the bus terminal 20, also called a port pin, with the write signal SWR as an output port with an inactive signal level. The second logic unit 12 then activates one of the test signals ST1, ST2, which simulates that the allowed level of the joint supply voltage VDD of the logic units 11, 12 has fallen short or has been exceeded as described in the document EP 2117094 A2, in response to which the monitoring circuit 13 blocks the logic circuit 23. The first test signal ST1 may be referred to as Test L and the second test signal ST2 as Test H. The first logic unit 11 now actively switches over the port 20 of the write signal SWR, and both logic units 11, 12 check whether the output of the logic circuit 23 remains inactive. This output is fed back to the logic units 11, 12 for verification. After a successful test, the first logic unit 11 switches the bus terminal 20 of the connection signal SWR to inactive, second logic unit 12 then deactivates the first test signal ST1, the first logic unit 11 resets port 20 as a write signal SWR and normal communication can continue.

Depending on the structure, multiple connection signals SWR, also called write signals, can be present, e.g. WR_H and WR_L for 16-bit buses. In this case, logic circuits 23 and feedback signals are provided for all connection signals SWR.

Since the bus subscriber 10 comprises two logic units 11, 12, the tasks of the bus subscriber 10 can be distributed to the two logic units 11, 12. As shown in FIG. 1, for example, the first logic unit 11 takes on communication and the second logic unit 12 takes on the test or tests. The two logic units 11, 12 can, for example, both be implemented as microcontrollers. A microcontroller can, for example, comprise a microprocessor and a memory. The monitoring circuit 13 may be implemented separately from the first and the second logic units 11, 12.

In an alternative embodiment, the first logic unit 12 is more powerful than the second logic unit 12 and performs both the communication and the test or tests. The second logic unit 12 then performs the necessary redundant tasks, especially for the actual safety function. The second logic unit 12 puts the bus subscriber 10 into the safe state. The two logic units 11, 12 can, for example, both be implemented as microcontrollers, with the second logic unit 12 being implemented as "inefficient." the first logic unit 12 is alternatively implemented as a microcontroller and the second logic unit as an ASIC, FPGA, finite state machine or watchdog.

In an alternative embodiment, the monitoring circuit 13 monitors another kind of common cause faults.

Figure 2:
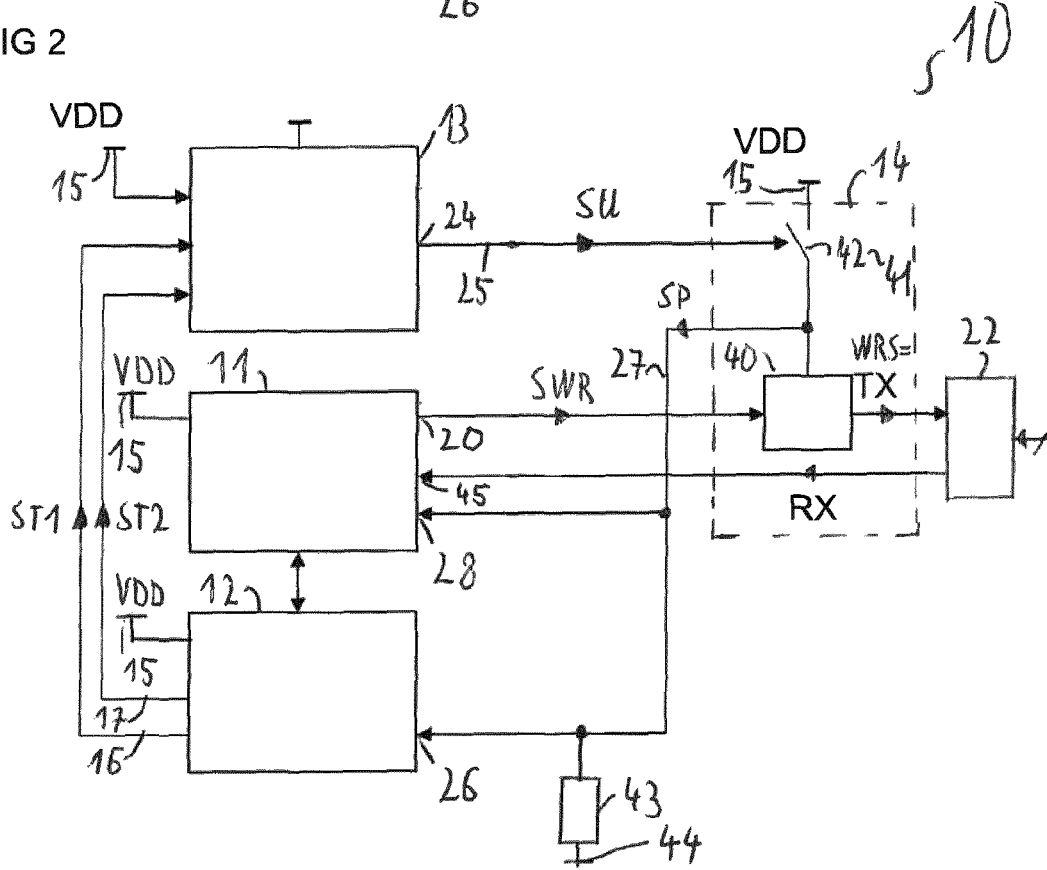

FIG. 2 shows another example embodiment of a bus subscriber 10, which is a further development of the embodiment shown in FIG. 1. The transmission unit 14 comprises a transmitting element 40 that is coupled on the input side with the bus terminal 20 of the first logic unit 11. The transmission element 40 is coupled on the output side with the MAC 22. The transmission unit 14 also has a switch arrangement 41, which is connected on the control side to the control output 24 of the monitoring circuit 13. One terminal of the switch assembly 41 is connected to a supply terminal of the transmitting element 40. Another terminal of the switch assembly 41 can be connected to the supply voltage terminal 15.

Switch assembly 41 comprises a switch 42, the control terminal of which is connected to the control output 24 of the monitoring circuit 13. The switch 42 thus couples the supply voltage terminal 15 with the transmitting element 40. A node between the switch 42 and the transmitting element 40 is connected to the signal input 26 of the second logic unit 12 and the signal input 28 of the first logic unit 11 via the feedback line 27. The MAC 22 may be coupled with a bus input 45 of first logic unit 11 via at least one signal line. A discharge circuit or a discharge resistor 43 is optionally positioned between the feedback line 27 and a reference potential terminal 44. The discharge resistor 43 can be implemented as a pull-down resistor.

In the communication phase, the first logic unit 11 emits the connection signal SWR to the transmitting element 40. The transmitting element 40 generates the bus signal WRS, also called the transmit signal TX. The bus signal WRS is supplied to the MAC 22, which in turn emits a signal to the bus 21. In the communication phase the MAC 22 receives a signal from the bus 21 and emits a receive signal RX to the bus input 45.

In the communication phase, the switch 42 is switched to conducting, so that the supply voltage VDD is supplied to the supply input of the transmitting element 40. In the communication phase, the monitoring signal SU sets the switch 42 to the conducting state.

If a fault occurs, the monitoring circuit 13 fashions the monitoring signal SU in such a way that the switch 42 is put into a non-conducting state. If the monitoring signal has the first logic value, the switch 42 is switched non-conducting and, if the monitoring signal SU has the second logic value, the switch 42 is switched to conducting.

In a test phase, the second logic unit 12 emits the first and/or the second test signal ST1, ST2 to monitoring circuit 13, which then provides the monitoring signal SU such that the switch 42 is switched to non-conducting. The transmitting element 40 is thus no longer supplied by the supply voltage VDD and thus emits no bus signal WRS, also called transmit signal TX. The voltage applied at the supply terminal of the transmitting element 40 is supplied as a test signal SP to the signal input 26 of the second logic unit 12 and the signal input 28 of first logic unit 11 via the feedback line 27. A decrease of the voltage value of the test signal SP is thus recorded by the second logic unit 12 and/or the first logic unit 11. So that this voltage declines in a short time, the discharge circuit or discharge resistor 43 connects the feedback line 27 with the reference potential terminal 44. The bus subscriber 10 may, for example, be implemented as a slave or a master.

The bus communication occurs through the MAC component 22, which is coupled to the first logic unit 11 via a serial connection, e.g. UART. This circuit can, for example, be found in a smart bus slave such as an IO module. The logic units 11, 12 have full control over the data transmission to the MAC 22.

The logic circuit 23 shown in FIG. 1 could be used in a similar manner in this case as well. However, the bus subscriber 10 frequently has a transmitting element 40 because a galvanic separation is usually advantageous at this point. The transmitting element 40 can, for example, be implemented as an optocoupler. The transmitter, i.e. the transmission unit 14, can be blocked by the supply voltage VDD being interrupted by means of the switch 42. The switch 42 can, for example, be implemented as a MOS transistor. The logic units 11, 12 activate the monitoring circuit 13 in a communication gap and check the switching off of the supply voltage VDD of the transmitting element 40 through a test procedure in a similar manner as in FIG. 1.

The bus subscriber 10 according to FIG. 2 has a serial connection TX as a data transmission mode. To implement secure data blocking, the supply voltage to the transmitting element 40 realized as an optocoupler is separated between the first logic unit 11 (realized as a microcontroller) and the MAC 22 (ASIC) at the level of a serial coupling (galvanically separated by optocouplers) (signal TX).

Figure 3:
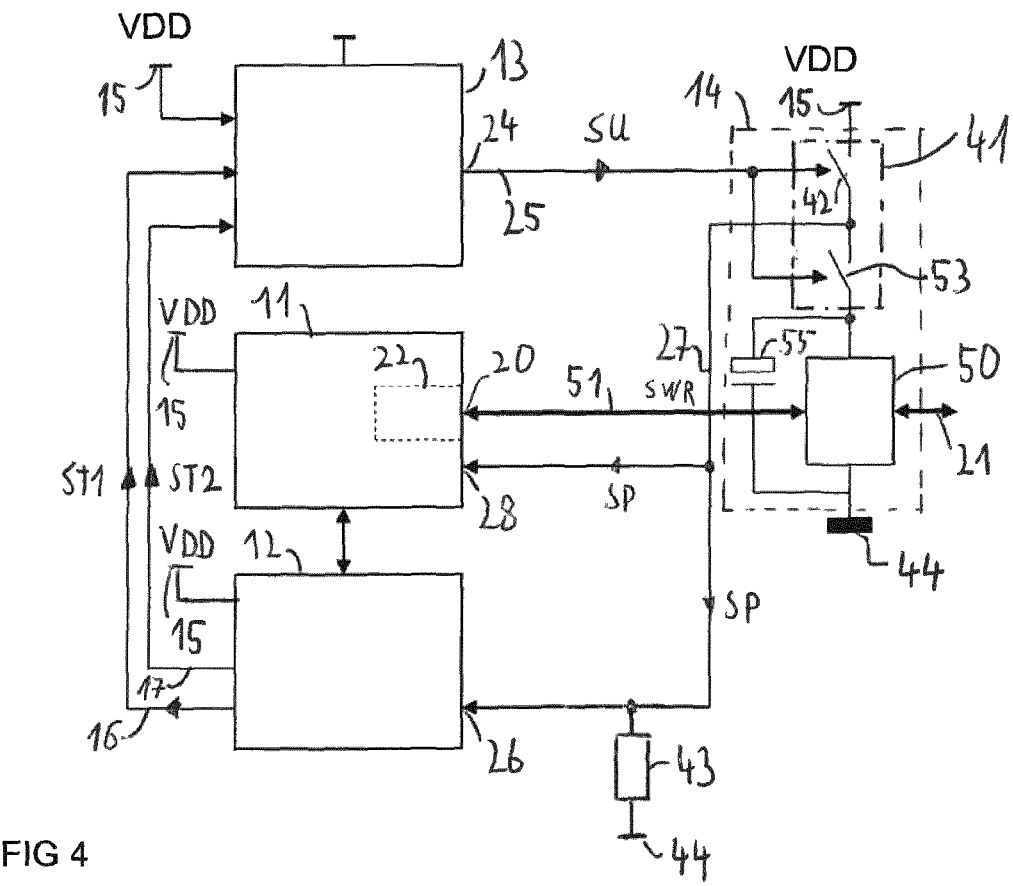

FIG. 3 shows another example embodiment of the bus subscriber 10, which is a further development of the embodiments shown in FIGS. 1 and 2. The first logic unit 11 comprises the MAC 22. The transmission unit 14 comprises a bus coupling 50. The bus coupling 50 can also be implemented as a physical bus coupling, abbreviated PHY. The bus coupling 50 can, for example, be implemented as a bus driver, bus transceiver, or coupling transformer. The bus coupling 50 is coupled with the MAC 22 via a bidirectional connection 51. The bidirectional connection 51 can comprise several lines.

The transmission unit 14 furthermore has the switch arrangement 41. One terminal of the switch arrangement 41 is connected to a supply terminal of the bus coupling 50. The switch arrangement 41 can comprise the switch 42 and another switch 53, which are serially connected to each other. The series circuit of the switch 42 and the other switch 53 couples the supply voltage terminal 15 to the supply terminal of the bus coupling 50. The control output 24 of the monitoring circuit 13 is connected to the control terminals of the circuit 42 and the other circuit 53 via the control line 25. On the output side, the switch arrangement 41 is connected via the feedback line 27 with the signal input 26 of the second logic unit 12 and the signal input 28 of the first logic unit 11. The bus coupling 50 is connected at the reference potential terminal 44. A capacitor 55 couples the supply terminal of the bus coupling 50 with the reference potential terminal 44.

In the communication phase, the switch 42 and the other switch 53 are switched to conduct. The supply voltage VDD is thus supplied to the supply terminal of the bus coupling 50. The capacitor 55 is charged to the supply voltage VDD.

In event of failure, the monitoring signal SU switches the switch 42 and the other switch 53 to non-conducting. The bus coupling 50 is supplied by the capacitor 55. It is only with a predetermined duration of the voltage interruption that the voltage at the capacitor 55, and thus at the supply terminal of the bus coupling 50, declines such that communication via the bus coupling 50 is advantageously interrupted in the event of a fault.

In a test phase, the second logic unit 12 emits the first and/or second test signal ST1, ST2 to the monitoring circuit 13, which switches the switch 42 and the other switch 53 to non-conducting by means of the monitoring signal SU. In the test phase, as in the case of a fault, the voltage at the node between the switch 42 and the other switch 53 declines, and thus the voltage at the feedback line 27 as well. The voltage drop is recorded by the second and/or the first logic unit 11, 12. The first and/or second logic unit 11, 12 thus detects whether the supply of the first and/or second test signal ST1, ST2 duly leads to an interruption of the coupling of the supply voltage terminal 15 to the supply terminal of the bus coupling 50.

The period of time needed for the test is short enough to allow power to be supplied to the bus coupling 50 through the capacitor 55. The first logic unit 11 can thus duly communicate with the bus 21 and bus coupling 50 via the built-in MAC 22, even if the first subscriber 10 is in the test phase. The length of a test can, for example, be on the order of 10 µs. Only in the event of an error is the communication of the first logic unit 11 with the bus 21 interrupted by the bus coupling 50.

The MAC 22 is integrated in the first logic unit 11; the internal interface between them is not accessible. The communication takes place between the MAC 22 and the external bus coupling 50, and is controlled by the MAC 22 and not by the first logic unit 11. This is, for example, the case if an Ethernet or CAN controller is integrated in the first logic unit 11. The bus coupling 50 can thus be implemented as an Ethernet PHY or CAN driver. Since the communication between the MAC 22 and the bus coupling 50 is not determined directly by the first logic unit 11, the method described based on FIGS. 1 and 2 cannot be applied without disrupting the normal data transmission.

According to FIG. 3, the supply voltage VDD of the external bus coupling 50 (a PHY or a driver) is interrupted by means of two switches 42, 53. The two switches 42, 53 can, for example, be implemented as MOS transistors. For the short test period, the bus coupling 50 supply is buffered through a appropriately sized capacitor 55, so that no ongoing communication is affected. A test method with simulation of the fault situation for the external monitoring circuit 13 is also used here, but is not synchronized with the normal data communication. The switch 42 interrupts the voltage supply; the other switch 53 disconnects the test signal SP from the buffer capacitor 55 so that the level of the test signal SP can fall to 0, i.e. 0 V. Each error, including an error of the two switches 42, 53, is thus reliably detected. The test signal SP is located on the feedback line 27. If the Ethernet PHY 50 is also integrated in the first logic unit 11, the same method can be used for the Ethernet transmitters in a similar manner.

In the case of Ethernet, the bus subscriber 10 according to FIG. 3 has a media independent interface, abbreviated MII, as the data transmission mode. To achieve secure data blocking, a separation is performed directly at the bus coupling 50 (PHY, transmitter) if it is not possible to get access between the first logic unit 11 (realized as microcontroller) and the MAC 22 and communication is not controlled by the first logic unit 11 but by the MAC 22. During the test, the bus coupling 50 continues to be supplied by the capacitor 55. The bus coupling 50 can be called a bus coupler.

The distribution of tasks between logic units 11, 12 shown in FIGS. 1 to 3—the first logic unit 11 performs the communication and the second logic unit 12 conducts the test—is only one example.

The first logic unit 11 generates the first and/or the second test signal ST1, ST2 in embodiments that are alternative to the examples in FIGS. 1 to 3.

Figure 4:
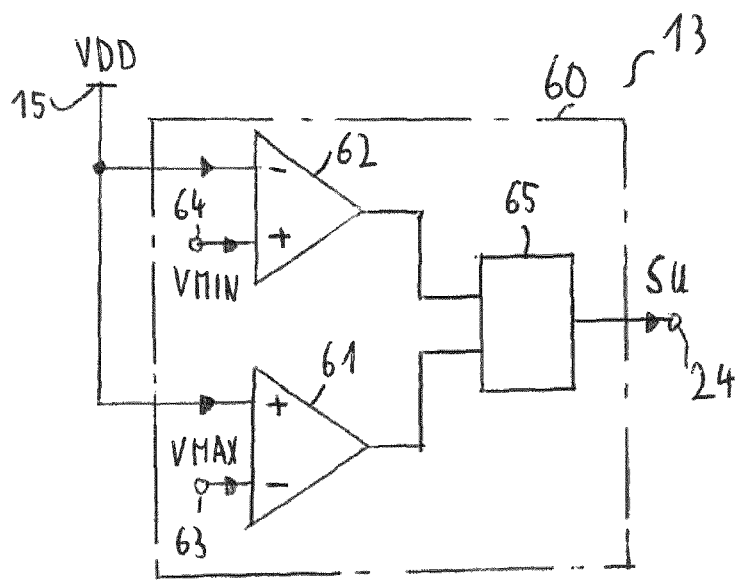

FIG. 4 shows an example embodiment of the monitoring circuit 13, which is a further development of the embodiment shown in FIGS. 1 to 3. The monitoring circuit 13 is implemented as window comparator 60. The window comparator 60 has a first and a second comparator 61, 62, which are coupled with the supply voltage terminal 15 at a first input. A second input of the first comparator 61 is coupled with a first reference voltage terminal 63. A second input of the second comparator 62 is correspondingly coupled with a second reference voltage terminal 64. The first input of the first comparator 61 can be configured as a non-inverted input and the second input can be configured as an inverting input. The first input of the second comparator 62 can be configured as an inverting input and the second input as a non-inverting input. The window comparator 60 furthermore comprises a logic gate circuit 65 coupled with the first and second comparators 61, 62 on the input side and with the control output 24 of the monitoring circuit 13 on the output side. The logic gate circuit 65 can, for example, have an OR function.

The maximum permissible supply voltage VMAX or a value representing this voltage can be applied at the first reference voltage terminal 63. The minimum permissible supply voltage VMIN or a value representing this voltage can be applied at the second reference voltage terminal 64. The first comparator 61 detects whether the supply voltage VDD is greater than the maximum permissible supply voltage VMAX. The second comparator 62 correspondingly detects whether the supply voltage VDD is less than the minimum permissible supply voltage VMIN. If the first comparator 61 detects that the supply voltage VDD is greater than the maximum permissible supply voltage VMAX, or the second comparator 62 detects that the supply voltage VDD is less than the minimum permissible supply voltage VMIN, the window comparator 60 forms the error signal SU with a value representing the fault situation, i.e. the first logic value, e.g. 1. The first and the second test signals ST1, ST2 are fed to the monitoring circuit 13 such that the monitoring signal SU is generated with a value representing the fault situation even at a supply voltage VDD with a value in the permissible range.

Figure 5:
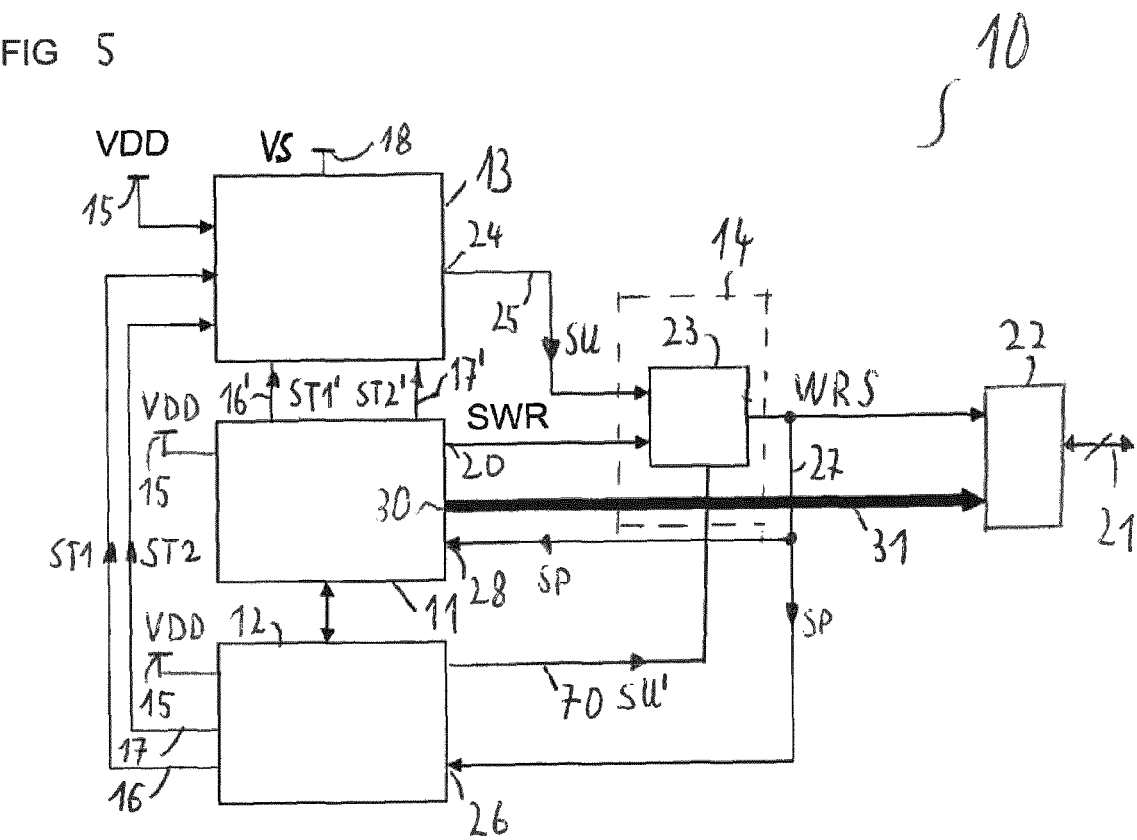

FIG. 5 shows another example embodiment of the bus subscriber 10, which is a further development of the embodiments shown in the above figures. An output of the first logic unit 11 is connected with another first control input of the monitoring circuit 13 via another first test line 16'. The first logic unit 11 can also be connected with another second control input of the monitoring circuit 13 via another second test line 17'.

The second logic unit 12 is connected with the transmission unit 14 via another control line 70. The other control line 70 couples the second logic unit 12 to the logic circuit 23. The second logic unit 12 outputs a blocking signal SU' to the transmission unit 14. The effect of the blocking signal SU' can be like the effect of the monitoring signal SU. The blocking signal SU' can interrupt the communication via the transmission unit 14, for example in the test phase and given a fault determined in the first logic unit 11.

The monitoring circuit 13 is implemented external to the first and the second logic units 11, 12. For example, the monitoring circuit 13 can be made to be separate from the first and the second logic units 11, 12. The first and second logic units 11, 12 monitor each other and block communication if a fault is discovered. The first logic unit 11 can block the communication directly. The second logic unit 12 can block the communication via the blocking signal SU'.

In the test phase, the first logic unit 11 emits another first test signal ST1' to the monitoring circuit 13 via the other first test line 16'. The first logic unit thus triggers a first test in the monitoring circuit 13.

The first test can be performed as described above (e.g. as explained based in FIG. 1). In the first test, an undervoltage of the supply voltage VDD is simulated. The other first test signal ST1' and the first test signal ST1 are connected with a logical OR circuit in the monitoring circuit 13.

In another section of the test phase, the first logic unit 11 can emit another second test signal ST2' to the monitoring circuit 13 via the other second test line 17'. The first logic unit 11 can thus trigger a second test in the monitoring circuit 13. The second test can be performed as described above (e.g. as explained based on FIG. 1). In the second test, an overvoltage of the supply voltage VDD is simulated. The other second test signal ST2' and the second test signal ST2 are connected with a logic OR circuit in the monitoring circuit 13.

In an alternative embodiment, the first and the second test lines 16, 17 can be omitted. The other first and other second test lines 16',17' thus assume the function of the first and second test lines 16, 17. The other first and other second test signals ST1', ST2' have the effect of the first and second test signals ST1, ST2.

The embodiments of the bus subscriber 10 shown in FIGS. 2 and 3 can also optionally have the other first test line 16' and/or the other second test line 17' and/or the other control line 70.

The bus subscriber 10 according to FIGS. 1 and 5 has a parallel address/data bus (SWR is the associated write signal) as a data transfer mode. To implement secure data blocking, a separation is performed at the level of the write signal of the parallel address/data bus between the first logic unit 11 (realized as microcontroller) and the MAC 22 (ASIC) through the gate 23.

Figure 6:
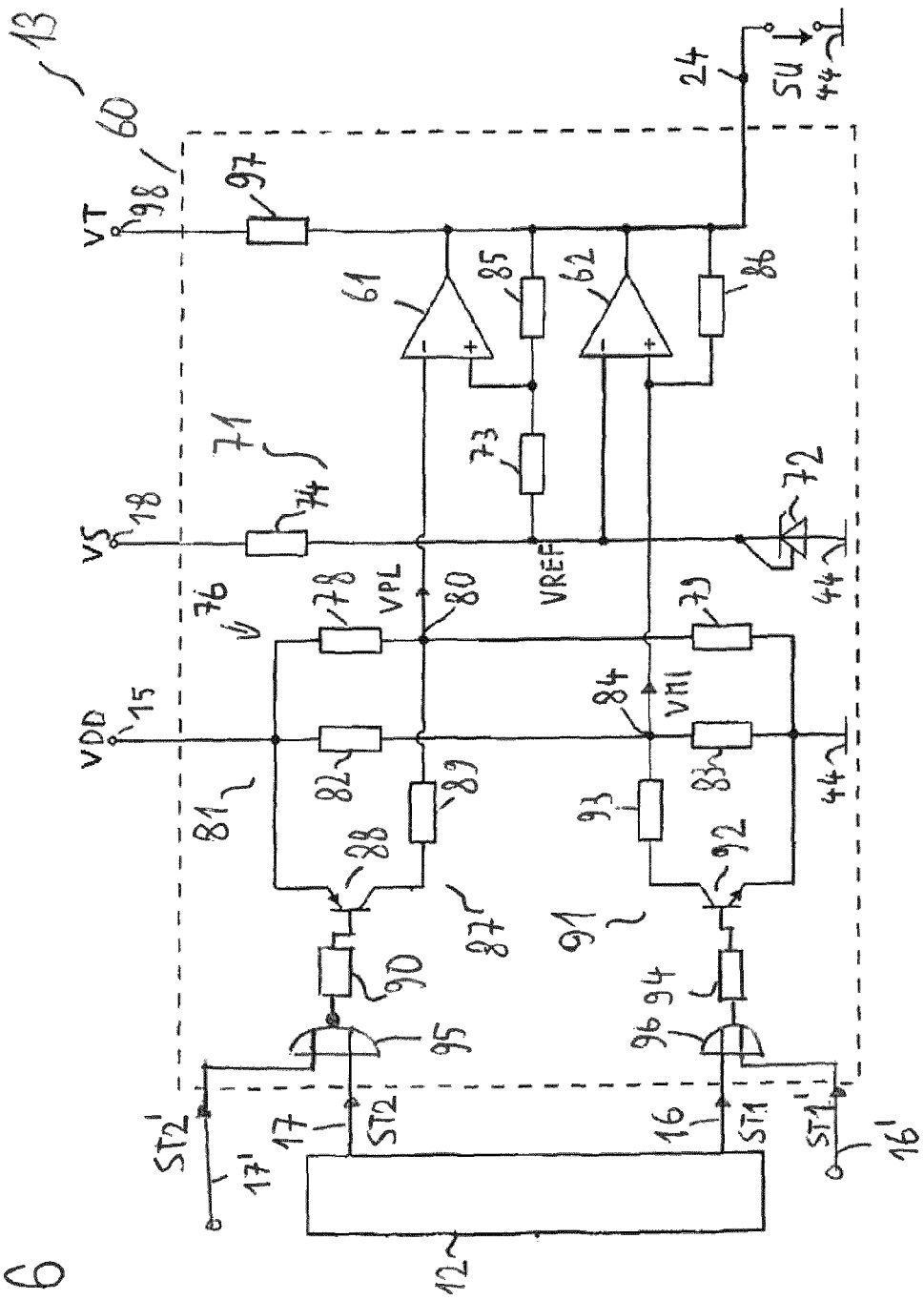

FIG. 6 shows an example embodiment of the monitoring circuit 13, which is a further development of the embodiment shown in FIG. 4. The monitoring circuit 13 according to FIG. 6 can be used in one of the embodiments of the bus subscriber 10 according to FIGS. 1, 2, 3 and 5. The monitoring circuit 13 comprises the window comparator 60 with the first and the second comparators 61, 62. The monitoring circuit 13 further comprises a reference voltage generator 71. The reference voltage generator 71 has a Zener diode 72. One terminal of the Zener diode 72 is connected to a first input of the first comparator 61. A coupling resistor 73 can be placed between the terminal of the Zener diode 72 and the first input of the first comparator 61. The coupling resistor 73 enables a hysteresis of the switching of the first comparator 61. The first input of the first comparator 61 is implemented as a non-inverting input and the second input of the first comparator 61 is implemented as an inverting input. The Zener diode 72 is connected to another terminal with the reference potential terminal 44.

The second comparator 62 has a first and a second input. The first input can be implemented as a non-inverting input and the second input as an inverting input. The terminal of the Zener diode 72 is connected to the second input of the second comparator 62.

The monitoring circuit 13 additionally has a ballast resistor 74 that is serially connected to the Zener diode 72. A series circuit comprising the ballast resistor 74 and the Zener diode 72 couples the other supply voltage terminal 18 with the reference potential terminal 44.

The monitoring circuit 13 furthermore comprises a first voltage divider 76 that couples the supply voltage terminal 15 with the reference potential terminal 44. The first voltage divider 76 has first and second voltage divider resistors 78, 79. A first voltage divider pickup 80 between the first and the second voltage divider resistors 78, 79 is connected with the second input of the first comparator 61. The monitoring circuit 13 additionally comprises a second voltage divider 81 that couples the voltage supply terminal 15 with the reference potential terminal 44. The second voltage divider 81 comprises third and fourth voltage divider resistors 82, 83 as well as a second voltage divider pickup 84 between the third and fourth voltage divider resistors 82, 83. The second voltage divider pickup 84 is connected to the first input of the second comparator 62.

The first input of the first comparator 61 is connected with the output of the first comparator 61 via a first feedback resistor 85. The first input of the second comparator 62 is connected with the output of the second comparator 62 via a second feedback resistor 86. A hysteresis of the first and second comparators 61, 62 can be set by means of the first and second feedback resistors 85, 86.

The output of the first comparator 61 and the output of the second comparator 62 are coupled with the control output 24 of the monitoring circuit 13. For this purpose, the output of the first comparator 61 and the output of the second comparator 62 are connected directly to the control output 24. The control output 24 is coupled with a supply terminal 98 via a resistor 97.

The monitoring circuit 13 additionally has a first test circuit 87 that is connected with the first voltage divider 76. The first test circuit 87 comprises a first switch 88, the controlled section of which is located between the voltage supply terminal 15 and the first voltage divider pickup 80. The first switch 88 is implemented as a bipolar transistor. The emitter and collector of the bipolar transistor are thus coupled with the voltage supply terminal 15 and the first voltage divider pickup 80. The first switch 88 is connected to the first voltage divider pickup 80 via a ballast resistor 89. The bipolar transistor can be implemented as a PNP bipolar transistor. The second test line 17 is coupled with a control input of the first switch 88 via the second control input of monitoring circuit 13 and a first drive resistor 90 of the first test circuit 87. The first drive resistor 90 thus couples the second test line 17 with the base of the bipolar transistor.

The first switch 88 can alternatively be implemented as a metal oxide semiconductor transistor, MOS transistor for short. The first switch 88 can, for example, be implemented as a p-channel MOS transistor. The first drive resistor 90 can be omitted and replaced by a line.

Monitoring circuit 13 furthermore comprises a second test circuit 91 that is coupled with the second voltage divider 81. The second test circuit 91 couples the second voltage divider pickup 84 with the reference potential terminal 44. The second test circuit 91 comprises a second switch 92. A controlled section of the second switch 92 is located between the second voltage divider pickup 84 and the reference potential terminal 44. The second switch 92 is implemented as a bipolar transistor. An emitter and a collector of the bipolar transistor are coupled with the second voltage divider pickup 84 and the reference potential terminal 44. The bipolar transistor can be realized as an NPN bipolar transistor. A second ballast resistor 93 connects the second switch 92 to the second voltage divider pickup 84. The first test line 16 is coupled with a control input of the second switch 92 via the first control input of the monitoring circuit 13 and a second drive resistor 94 of the second test circuit 91.

The second switch 92 can alternatively be realized as a MOS transistor. The second switch 92 can, for example, be implemented as a p-channel MOS transistor. The second drive resistor 94 can be omitted and replaced by a line.

The other second control input of the monitoring circuit 13 can optionally be coupled with the control input of the first switch 88. For this purpose, the monitoring circuit 13 can have a first logic gate 95, which couples the other second control input and the second control input of monitoring circuit 13 with the control input of the first switch 88 via the drive resistor 90. The other second test line 17' shown in FIG. 5 is thus connected to the first test circuit 87. The first logic gate 95 constitutes an OR function. The first logic gate 95 can, for example, be implemented as OR or a NOR gate.

The other first control input of the monitoring circuit 13 can optionally be coupled with the control input of the second switch 92. For this purpose, the monitoring circuit 13 can have a second logic gate 96 that couples the other first control input and the first control input of the monitoring circuit 13 with the control terminal of the second switch 92. The other first test line 16' is thus connected to the second test circuit 91. The second logic gate 96 constitutes an OR function. The second logic gate 96 can be implemented as an OR or a NOR gate.

The reference voltage generator 71 generates a reference voltage VREF. The reference voltage VREF decreases through the Zener diode 72. The reference voltage VREF is supplied to the first input of the first comparator 61 and the second input of the second comparator 62. The supply voltage VDD is applied to the voltage supply terminal 15. A first output voltage VPL, which is fed to the second input of the first comparator 61, is present at the first voltage divider pickup 80.

The first comparator 61 compares the first output voltage VPL with the voltage applied at the first input of the first comparator 61. This voltage can be equal to the reference voltage VREF. Depending on the choice of resistance values of the coupling resistor 73 and the first feedback resistor 85, the voltage applied to the first input of the first comparator 61 can deviate slightly from the reference voltage VREF. The coupling resistor 73 and the first feedback resistor 85 determine the hysteresis of the first comparator 61. The output of the first comparator 61 is switched to "high" as long as the first output voltage VPL is smaller than the reference voltage VREF. The output of the first comparator 61 is accordingly switched to "low" if the reference voltage VREF is lower than the first output voltage VPL. The first comparator 61 serves the purpose of overvoltage detection.

The first comparator 61 thus emits the "high" signal as long as the supply voltage VDD is below the maximum permissible supply voltage VMAX. The maximum permissible supply voltage VMAX has a value according to the following equation:

$$VMAX = VREF(R1+R2)/R2,$$

where R is the resistance of the first voltage divider resistor 78, R2 is the resistance of the second resistor 79, and VREF is the value of the reference voltage.

A second output voltage VMI that is fed to the first input of the second comparator 62 is accordingly present at the second voltage divider pickup 84. The second comparator 62 also compares the second output voltage VMI with the reference voltage VREF. The second comparator 62 accordingly emits the "high" signal at its output if the second output voltage VMI is greater than the reference voltage VREF. The second comparator 62 emits the "low" signal at its output if the second output voltage VMI is smaller than the reference voltage VREF. The second comparator 62 provides the "high" signal on the output side if the supply voltage VDD is greater than the minimum permissible supply voltage VMIN. The value of the minimum permissible supply voltage VMIN can be calculated by means of the following equation:

$$VMIN = VREF(R3+R4)/R4,$$

where R3 is the resistance of the third voltage divider resistor 82 and R4 is a resistance of the fourth voltage divider resistor 83. The second comparator 62 serves the purpose of undervoltage detection.

If the supply voltage VDD is in a permissible range, both the first and the second comparators 61, 62 emit the "high" signal. The monitoring signal SU is applied at the signal output 24. The monitoring signal SU thus has the "high" value as long as the supply voltage VDD is in the permissible voltage range. The permissible voltage range for the supply voltage VDD is defined as: VMIN<VDD<VMAX.

If the supply voltage VDD is below the minimum permissible supply voltage VMIN, the second comparator 62 emits the "low" signal, so that the monitoring signal SU likewise assumes the "low" value. Accordingly: If the supply voltage VDD rises above the maximum permissible supply voltage VMAX, the first comparator 61 emits the "low" signal, so that the monitoring signal SU also assumes the "low" value. The "low" value roughly corresponds to 0 V. The "high" value corresponds to a voltage value different from 0 V. The "high" value can roughly correspond to the voltage of a supply voltage VT that is supplied to the supply terminal 98. The "low" value can be identified as the first logical value or as "0", and the "high" value as the second logical value or "1."

The first and second comparators 61, 62 have open collector outputs. At "low" values these outputs are connected to the ground potential, and at a "high" value the output's connection to the ground potential is interrupted. The resistor 97 is implemented as a pull-up resistor. The voltage VT applied to the supply terminal 98 can correspond to the supply voltage VDD or the other supply voltage VS. For this purpose, the supply terminal 98 is connected with either the supply voltage terminal 15 or the other supply voltage terminal 18.

The first test signal ST1 is supplied to the second test circuit 91. In the test phase, the first test signal ST1 switches the second switch 92 to a conducting state. The first test signal ST1 leads to a change of the second output voltage VMI. The second output voltage VMI is reduced by the first test signal ST1, so that the "low" value is picked up at the output of the second comparator 62. The second output voltage VMI provided by the second voltage divider 81 is changed by a current path connected in parallel with the fourth voltage divider resistor 83 being switched to conductive in the test phase. Since the second switch 92 is turned on, the ballast resistor 93 is connected in parallel with the fourth voltage divider resistor 83.

The other first test signal ST1' can be correspondingly be supplied to the second test circuit 91. The other first test signal ST1' sets the second switch 92 to a conducting state in the test phase, so that the second output voltage VMI is reduced. An undervoltage of the voltage output VDD is thus simulated by the first and/or the other first test signals ST1, ST1'.

The second test signal ST2 is supplied to the first test circuit 87. The second test signal ST2 sets the first switch 88 to a conducting state in the continued section of the test phase. The second test signal ST2 changes the first output voltage VPL in the continued section of the test phase. The second test signal ST2 raises the first output voltage VPL so that the first comparator 61 provides the "low" value at the output. The first comparator 61 thus signals an overvoltage, even if the supply voltage VDD is lower than the maximum permissible supply voltage VMAX. In the continued section of the test phase, the first output voltage VPL provided by the first voltage divider 76 is changed by the current path connected in parallel with the first voltage divider resistor 78 being switched to conducting. Since the first switch 88 is switched on, the ballast resistor 89 is connected in parallel with the first voltage divider resistor 78.

The second test signal ST2 is likewise supplied to the first test circuit 87. The other second test signal ST2' switches the first switch 88 to a conducting state in the continued section of the test phase. The other second test signal ST2' also leads to an increase of the first output voltage VPL and thus to a "low" value of the output signal of the first comparator 61. An overvoltage of the supply voltage VDD is thus simulated by the second and/or the other the second test signal ST2, ST2'.

An undervoltage and/or an overvoltage can be advantageously simulated by changing the first and the second voltage dividers 76, 81. An overvoltage and/or an undervoltage can thus be simulated even if the supply voltage VDD to be monitored is between the limit values VMIN, VMAX.

The monitoring signal SU results from an OR connection of the output signal of the first comparator 61 and the output signal of the second comparator 62. If one of the two comparators 61, 62 shows a fault situation, the monitoring signal SU also shows a fault situation. If the first comparator 61 shows an overvoltage or the second comparator 62 shows an undervoltage, the monitoring signal SU has a logic value signaling the fault situation.

The Zener diode 72 provides the reference voltage VREF at a predetermined value with high accuracy, even if the other supply voltage VS, which is fed to the other supply voltage terminal 18, fluctuates.

In an alternative embodiment, the monitoring circuit 13 comprises an inverter, which is connected upstream of the signal output 24. The outputs of the first and second comparators 61, 62 are coupled with the signal output 24 via the inverter. In this case the monitoring signal SU has the "high" value as soon as the supply voltage VDD is outside the permissible voltage range and the "low" value as soon as the supply voltage VDD is within the permissible supply voltage range.

In an alternative embodiment, the second and the other test lines 17, 17', the first test circuit 87, and the first logic gate 95 are omitted. Only the case of undervoltage is thus simulated. The first comparator 61 can also be omitted.

In an alternative embodiment, the first test line 16 or the other first test line 16' is omitted. The second logic gate 96 is replaced by a connection.

In an alternative embodiment, the second test line 17 or the other second test line 17' is omitted. The first logic gate 95 is replaced by a connection.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS 10 bus subscriber
11 first logic unit
12 second logic unit
12 monitoring circuit
14 transmission unit
15 supply voltage terminal
16, 16' first test line
17, 17' second test line
18 other supply voltage terminal
20 bus terminal
21 bus
22 media access control
23 logic circuit
24 control output
25 control line
26 signal input
27 feedback line
28 signal input
30 other bus terminal
31 bus line
40 transmitting element
41 switch arrangement
42 switch
43 discharge resistor
44 reference potential terminal
45 bus input
50 bus connection
51 bidirectional connection
53 other switch
55 capacitor
60 window comparator
61 first comparator
62 second comparator
63 first reference voltage terminal
64 second reference voltage terminal
65 logic gate circuit
70 other control line
71 reference voltage generator
72 Zener diode
73 coupling resistor
74 ballast resistor
76 first voltage divider
78 first voltage divider resistor
79 second voltage divider resistor
80 first voltage divider pickup
81 second voltage divider pickup
82 third voltage divider resistor
83 fourth voltage divider resistor
84 second voltage divider pickup
85 first feedback resistor
86 second feedback resistor
87 first test circuit
88 first switch
89 ballast resistor
90 first drive resistor
91 second test circuit
92 second switch
93 ballast resistor
94 second drive resistor
95 first logic gate
96 second logic gate
97 resistor
98 supply voltage terminal
SP test signal
RX receive signal
ST1' first test signal
ST2' second test signal
SU monitoring signal
SU' blocking signal
SWR connection signal
TX transmit signal
VDD supply voltage
VMI second output voltage
VMIN minimum permissible supply voltage
VMAX maximum permissible supply voltage
VPL first output voltage
VREF reference voltage
VS other supply voltage
VT supply voltage
WRS bus signal

The invention claimed is:

1. A device, the device having a safe state, the device being coupleable to a communication bus, the device comprising:
processing circuitry, the processing circuitry comprising:
a first logic unit and a second logic unit, wherein:
the first logic unit and the second logic unit are bidirectionally coupled to each other,
the first logic unit comprises a bus terminal, the first logic unit being configured to output a connection signal via the bus terminal in a communication phase;
a transmission unit, the transmission unit having an input coupled to the bus terminal of the first logic unit and configured to receive the connection signal, the transmission unit being configured to controllably output, via an output of the transmission unit, a bus signal based upon a monitoring signal received at a control input and the received connection signal;
a monitoring circuit, the monitoring circuit comprising a control output coupled to the control input of the transmission unit, the monitoring circuit configured to controllably output the monitoring signal to the control input of the transmission unit based upon a fault determination;
a first test line, the first test line coupling an output of the second logic unit or an output of the first logic unit to an input of the monitoring circuit, the second logic unit or the first logic unit being configured to controllably emit a first test signal to the monitoring circuit via the respective output and the test line to the monitoring circuit,
wherein the monitoring circuit is configured to controllably output the monitoring signal based upon the first test signal to simulate the fault determination, and
wherein the transmission unit is configured such that, upon receiving the monitoring signal indicating a fault situation: to not emit the bus signal at the output of the transmission unit or to emit the bus signal comprising an indication of an inactive state or an inactive level.

2. The device according to claim 1, wherein the processing circuitry further comprises:
a media access controller, the media access controller being communicatively connectible to the communication bus, the media access controller being configured to receive the bus signal via the transmission unit and output the bus signal to the communication bus.

3. The device according to claim 1, wherein the processing circuitry comprises a second test line, the second test line coupling a second output of the second logic unit to a second input of the monitoring circuit.

4. The device according to claim 1, wherein the output of the transmission unit is coupled to a signal input of the second logic unit.

5. The device according to claim 1, wherein the monitoring circuit is configured to determine an occurrence of the fault situation based upon determining that a supply voltage of the device is outside of a predetermined rage.

6. The device according to claim 1, wherein the first logic unit or the second logic unit is configured to determine, in a test phase, whether the transmission unit receives the monitoring signal.

7. The device according to claim 1, wherein the first logic unit or the second logic unit is configured to determine in the a phase whether the transmission unit blocks communication after receiving the monitoring signal.

8. The device according to claim 1, wherein the monitoring circuit is configured to generate the monitoring signal when an error occurs due to common causes or a failure occurs due to the common causes.

9. The device according to claim 8, wherein the monitoring circuit is configured to determine the occurrence of the error due to the common causes or the failure due to the common causes upon detection of an error or a failure of both the first logic unit and the second logic unit that occurs as a result of a single fault cause or a single event.

10. The device according to claim 1, wherein the monitoring circuit is configured to generate the monitoring signal when a supply voltage of the first logic unit and the second logic unit is outside a predetermined range.

11. The device according to claim 1, wherein the control output of the monitoring circuit is coupled to the transmission unit via a control line of the bus subscriber so as to output the monitoring signal to the transmission unit via the control line, and
wherein the transmission unit comprises a switch arrangement that is connected to the control line on a control side.

12. The device according to claim 1, wherein the first logic unit and the second logic unit are configured to monitor each other.

13. The device according to claim 1, wherein the transmission unit is a digital transmission unit, the first logic unit is a first digital logic unit, and the second logic unit is a second digital logic unit.

14. The device according to claim 1,
wherein the first logic unit is bidirectionally communicatively coupled to the second logic unit, and
wherein the first logic unit and the second logic unit each comprise: a microcontroller, a microprocessor, an ASIC, and FPGA, a finite state machine, or a watchdog.

15. The device according to claim 1, wherein the monitoring circuit is configured to emit the monitoring signal with a first logic value in the case of the fault and with a second logic value in a no fault situation.

16. The device according to claim 1, wherein the monitoring circuit comprises a window comparator, the window comparator comprising:
a first comparator comprising: a first input coupled to a supply voltage of the device; a second input coupled to a first reference voltage; and an output;
a second comparator comprising: a first input coupled to the supply voltage; a second input coupled to a second reference voltage; and an output; and
a logic OR circuit comprising: a first input coupled to the output of the first comparator; a second input coupled to the output of the second comparator; and an output coupled to the control output, wherein the logic OR circuit is configured to make the fault determination.

17. The device according to claim 1, wherein the monitoring circuit comprises a window comparator comprising:
a first logic gate comprising an input coupled to a second test line, which is coupled to the second logic unit; a second input is couled to
a first comparator
a second comparator.

18. A method of operating a device, the device having a safe state, the device coupled to a communication bus, the device comprising processing circuitry, the processing circuitry comprising: a first logic unit and a second logic unit, the first logic unit and the second logic unit being bidirectionally coupled to each other, the first logic unit having a bus terminal; a transmission unit, the transmission unit having an input coupled to a bus terminal of the first logic unit and a control input; a monitoring circuit, the monitoring circuit comprising a control output coupled to the control input of the transmission unit; and a first test line, the first test line coupling an output of the second logic unit or an output of the first logic unit to an input of the monitoring circuit, the method comprising:
the first logic outputting a connection signal via the bus terminal in a communication phase;
the transmission unit receiving the connection signal;
the monitoring circuit outputting a monitoring signal to the control input of the transmission unit based upon a fault determination;
the transmission unit outputting, via the output of the transmission unit, a bus signal based upon the monitoring signal received at the control input and the received connection signal; and
the second logic unit or the first logic emitting a first test signal to the monitoring circuit via the respective output and the test line to the monitoring circuit,
wherein the monitoring circuit outputs the monitoring signal based upon the first test signal to simulate the fault determination, and
wherein the transmission unit, upon receiving the monitoring signal indicating a fault situation: does not emit the bus signal at the output of the transmission unit or does emit the bus signal comprising an indication of an inactive state or an inactive level.

19. The method according to claim 18, further comprising:
determining in the test phase whether the transmission unit receives the monitoring signal from the monitoring circuit.

* * * * *